(12) United States Patent
Schwarzentruber

(10) Patent No.: US 9,856,109 B2
(45) Date of Patent: Jan. 2, 2018

(54) INPUTTING LOCK COMMANDS USING GESTURES

(71) Applicant: Inventio AG, Hergiswil (CH)

(72) Inventor: Josef Schwarzentruber, Udligenswil (CH)

(73) Assignee: INVENTIO AG, Hergiswil (CH)

( * ) Notice: Subject to any disclaimer, the term of this patent is extended or adjusted under 35 U.S.C. 154(b) by 56 days.

(21) Appl. No.: 14/650,023

(22) PCT Filed: Nov. 29, 2013

(86) PCT No.: PCT/EP2013/075184
§ 371 (c)(1),
(2) Date: Jun. 5, 2015

(87) PCT Pub. No.: WO2014/086691
PCT Pub. Date: Jun. 12, 2014

(65) Prior Publication Data
US 2015/0314986 A1    Nov. 5, 2015

(30) Foreign Application Priority Data
Dec. 6, 2012  (EP) ..................... 12195941

(51) Int. Cl.
*G05B 19/00* (2006.01)
*B66B 1/46* (2006.01)
*G07C 9/00* (2006.01)
*G06F 3/0488* (2013.01)
*G06F 3/0481* (2013.01)

(52) U.S. Cl.
CPC ............. *B66B 1/461* (2013.01); *B66B 1/463* (2013.01); *G06F 3/0488* (2013.01); *G06F 3/04817* (2013.01); *G07C 9/00134* (2013.01); *G07C 9/00174* (2013.01); *B66B 2201/4638* (2013.01); *B66B 2201/4676* (2013.01); *G07C 9/0069* (2013.01)

(58) Field of Classification Search
CPC ......... B66B 1/463; G06F 3/011; G06F 3/016; G06F 3/017; G06F 3/03547; G07C 9/00007
USPC ....... 340/5.51; 341/20, 26, 27; 345/173, 174
See application file for complete search history.

(56) References Cited

U.S. PATENT DOCUMENTS

| | | | | |
|---|---|---|---|---|
| 8,743,072 B2* | 6/2014 | Kim | ....................... | G06F 3/041 341/27 |
| 9,298,341 B2* | 3/2016 | Kim | ....................... | G06F 3/0481 |
| 2005/0139429 A1* | 6/2005 | Bisang | ................... | B66B 13/12 187/319 |
| 2007/0290630 A1* | 12/2007 | Kim | .................. | H05B 37/0227 315/308 |

(Continued)

FOREIGN PATENT DOCUMENTS

| CN | 101678997 A | 3/2010 |
|---|---|---|
| CN | 102358540 A | 2/2012 |

(Continued)

*Primary Examiner* — Carlos E Garcia
(74) *Attorney, Agent, or Firm* — William J. Clemens; Shumaker, Loop & Kendrick, LLP

(57) ABSTRACT

A user can input commands into a lock by gesturing on a surface of the lock. The gesture is made by sliding a finger over multiple buttons on the lock surface. The lock recognizes the gesture based on the buttons touched by the sliding finger and the order in which they were touched. The lock associates a particular command with the recognized gesture.

16 Claims, 6 Drawing Sheets

(56) References Cited

U.S. PATENT DOCUMENTS

| | | | | |
|---|---|---|---|---|
| 2007/0291009 | A1* | 12/2007 | Wright | G06F 3/044 345/173 |
| 2008/0224836 | A1* | 9/2008 | Pickering | B60R 25/2045 340/426.14 |
| 2009/0289916 | A1* | 11/2009 | Dai | G06F 3/04883 345/173 |
| 2011/0100762 | A1 | 5/2011 | Gerstenkorn et al. | |
| 2011/0148572 | A1 | 6/2011 | Ku | |
| 2011/0210917 | A1 | 9/2011 | LaFave et al. | |
| 2014/0014444 | A1* | 1/2014 | Kauppinen | B66B 1/468 187/389 |
| 2014/0062220 | A1* | 3/2014 | Yoon | H03K 17/943 307/117 |
| 2014/0069015 | A1* | 3/2014 | Salter | E05B 81/76 49/31 |
| 2015/0246790 | A1* | 9/2015 | Hiltunen | B66B 1/461 187/382 |
| 2015/0363026 | A1* | 12/2015 | Hu | G08C 17/02 340/12.55 |
| 2016/0277023 | A1* | 9/2016 | Nakajima | H03K 17/962 |

FOREIGN PATENT DOCUMENTS

| | | |
|---|---|---|
| EP | 2189598 A1 | 5/2010 |
| JP | 2000335838 A | 12/2000 |
| JP | 2008230811 A | 10/2008 |
| JP | 2011037570 A | 2/2011 |
| WO | 2012111904 A1 | 8/2012 |

* cited by examiner

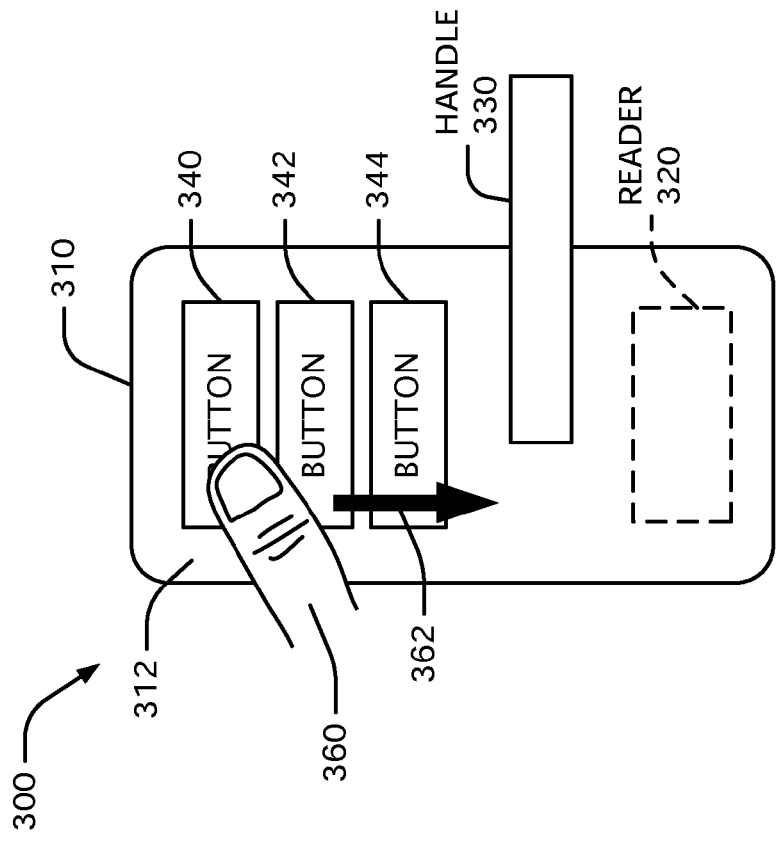
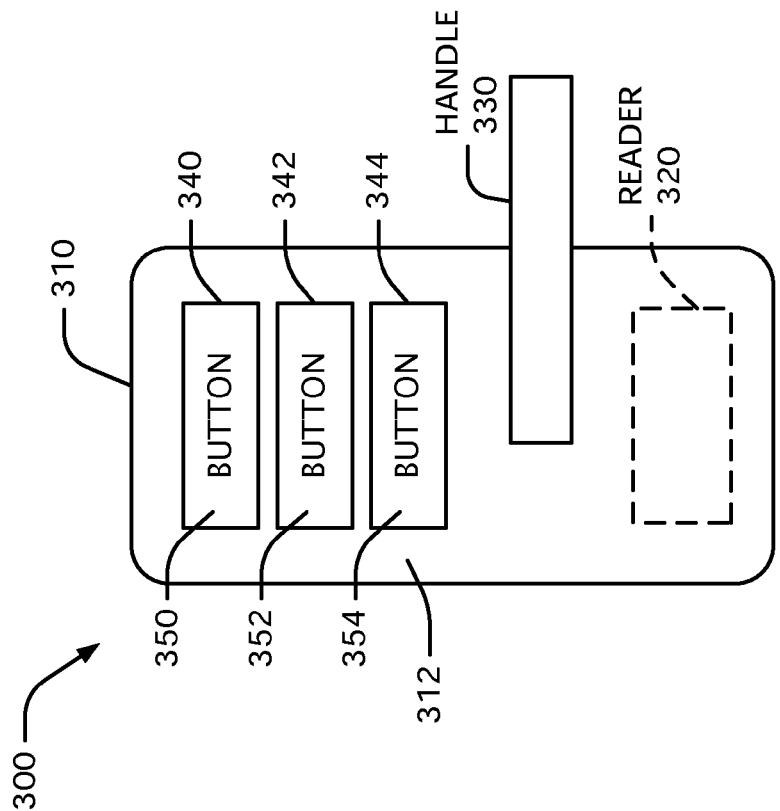

INPUTTING LOCK COMMANDS USING GESTURES

FIELD

The disclosure relates to electronic locks.

BACKGROUND

Electronic locks can often receive one or more commands from a user. For example, a user can press a button to activate or deactivate the lock.

US20110100762A1 describes a system with command buttons on, for example, a door trim. The command buttons can initiate commands for actions within a system.

In some cases, a user may accidentally press a button on a lock, such as when grabbing a door to open or close the door. Thus, the user may unintentionally input a command into the lock.

SUMMARY

A user can input commands into a lock by gesturing on a surface of the lock. The gesture is made by sliding a finger over multiple buttons on the lock surface. The lock recognizes the gesture based on the buttons touched by the sliding finger and based on the order in which they were touched. The lock associates a particular command with the recognized gesture.

Some embodiments of a method comprise: detecting a sliding finger on a first touch sensitive button on a surface of an electronic lock system for a door; detecting the sliding finger on a second touch-sensitive button on the surface of the electronic lock system; and determining a command associated with a gesture, the gesture being based on the detecting of the sliding finger on the first and second touch-sensitive buttons. The method can further comprise sending the determined command to a component of the electronic lock system or to an external component coupled to the electronic lock system. The detecting the sliding finger on the first touch-sensitive button can occur before the detecting the sliding finger on the second touch-sensitive button, the determined command comprising a first command of two commands. The detecting the sliding finger on the second touch-sensitive button can occur before the detecting the sliding finger on the first touch-sensitive button, the determined command comprising a second command of two commands. The method can further comprise detecting the sliding finger on a third touch-sensitive button on the surface of the electronic lock system, the determining the gesture being further based on the detecting of the sliding finger on the third touch-sensitive button. The method can also further comprise switching the electronic lock system between a single-button input mode and a gesture input mode. In some cases, the electronic lock system is mounted on or near the door.

At least some embodiments of an electronic lock system for a door comprise: a first touch-sensitive button; a second touch-sensitive button; and a control unit coupled to the first and second touch-sensitive buttons, the control unit being programmed to, detect a sliding finger on the first touch-sensitive button, detect the sliding finger on the second touch-sensitive button, determine a gesture based on the detecting of the sliding finger on the first and second touch-sensitive buttons, and determining a command associated with the determined gesture. The control unit can also be coupled to an elevator system. The lock system can further comprise a third touch-sensitive button. The first touch-sensitive button can be non-continuous with the second touch-sensitive button. In some cases, the first touch-sensitive button comprises a first button surface area, the first touch-sensitive button providing a same input signal across the entire first button surface area. In further cases, the first and second touch-sensitive buttons are hard-wired on the surface of the electronic lock system. In particular embodiments, the control unit being unable to determine on which portion of the first touch-sensitive button the sliding of the finger occurred.

Further embodiments of a method comprise: detecting a sliding finger on a first touch-sensitive button on a surface of an electronic lock system for a door; detecting the sliding finger on a second touch-sensitive button on the surface of the electronic lock system; and determining a command associated with a gesture, the gesture being based on the detecting of the sliding finger on the first and second touch-sensitive buttons. In some cases, such embodiments further comprise sending the determined command to a component of the electronic lock system or to an external component coupled to the electronic lock system.

Further embodiments of an electronic lock system for a door comprise: a first touch sensitive button; a second touch-sensitive button; and a control unit coupled to the first and second touch-sensitive buttons and to an elevator system, the control unit being programmed to detect a sliding finger on the first touch-sensitive button, detect the sliding finger on the second touch-sensitive button, and determine a command associated with a gesture, the gesture being based on the detecting of the sliding finger on the first and second touch-sensitive buttons. In further variations of the electronic lock system, the control unit is further coupled to an elevator system or to an access control system.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as DRAM or SRAM) and/or nonvolatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures:

FIGS. 3A and 3B show an exemplary embodiment of a lock.

DETAILED DESCRIPTION

Figure 1:
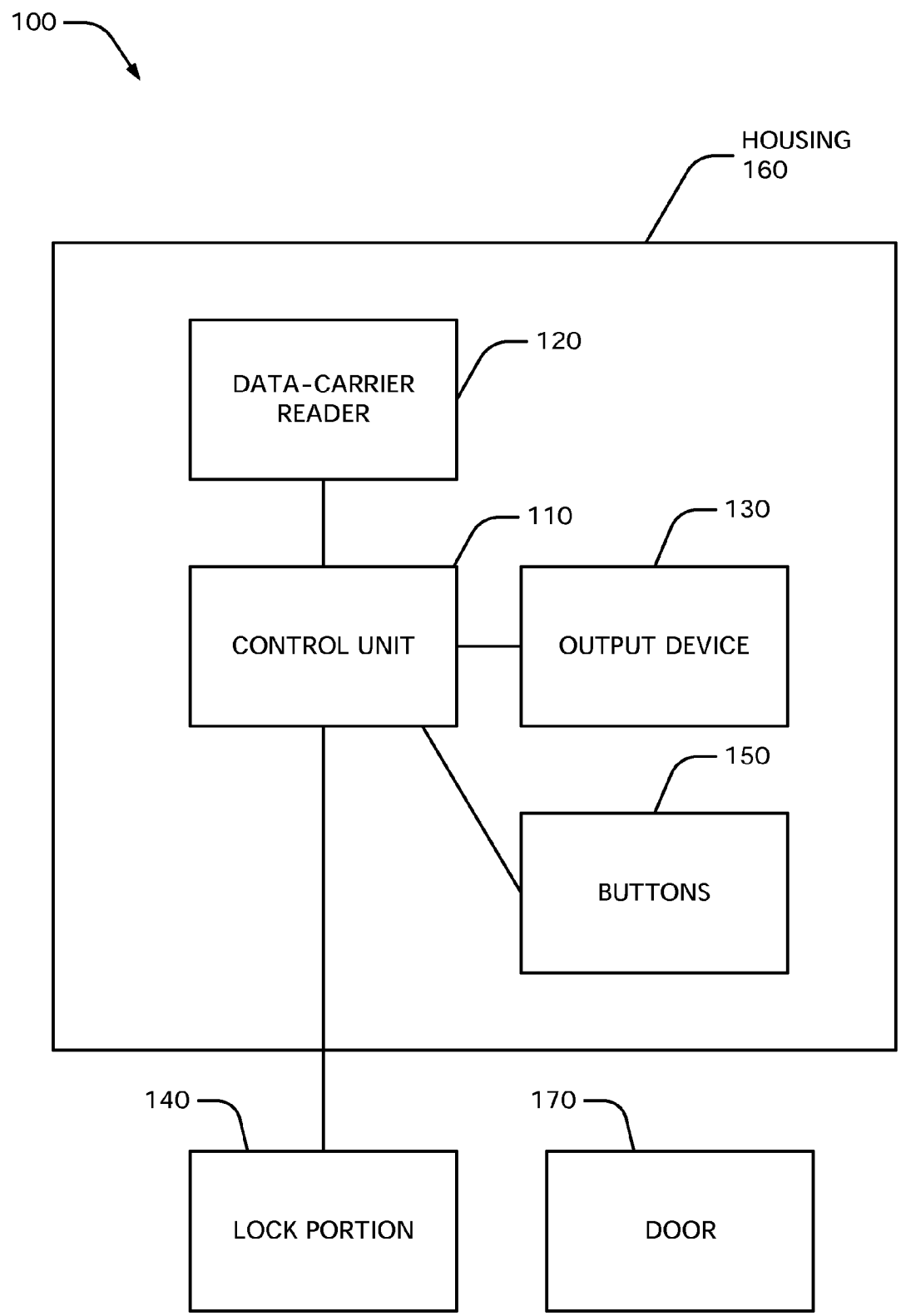
FIG. 1 shows a block diagram of an exemplary embodiment of an electronic lock system.

FIG. 1 shows a block diagram of an exemplary embodiment of an electronic lock system 100. The lock system 100 comprises a control unit 110, which is a computer-based device comprising a processor and a computer-readable storage medium. The computer-readable storage medium contains instructions that, when executed by the processor, cause the control unit 110 to perform one or more method acts described herein. The control unit 110 can be coupled to one or more other components in the lock system 100. For example, the control unit 110 can be coupled to a data-carrier reader 120 that is designed to detect the presence of a data carrier and read information from the data carrier. In some embodiments, the reader 120 is a radio-frequency identification (RFID) reader. In further embodiments, the reader 120 is a near-field communication (NFC) reader or a far-field communication reader. In other embodiments, the reader 120 comprises an optical code reader. The control unit 110 can also be coupled to two or more buttons 150. Various embodiments of the buttons 150 are described below. The control unit 110 can also be coupled to an output device 130, which can visually and/or audibly communicate information to a user. In various embodiments, the output device 130 comprises, for example: one or more LEDs (light-emitting diodes); one or more LCDs (liquid-crystal displays); one or more LCD display panels; a speaker; and/or one or more light bulbs. A lock portion 140 coupled to the control unit 110 can comprise, for example, a lock component that engages or disengages with a door frame or other component to allow a door to be opened or closed.

In some cases, one or more components of the system 100 are communicatively coupled to additional components by a network (not shown).

In particular embodiments, at least some of the components of the lock system 100 are contained in a housing 160. The housing 160 can, for example, be positioned in or on a door 170 that is locked or unlocked by the lock system 100. The housing 160 can also be positioned remotely from the door 170, or near (but outside of) the door 170. The buttons 150 can be positioned on the exterior of the housing 160. In other cases, the buttons 150 are positioned elsewhere, such as to the side of the housing 160. The lock portion 140 can be located outside of the housing 160, or within the housing 160.

Figure 2:
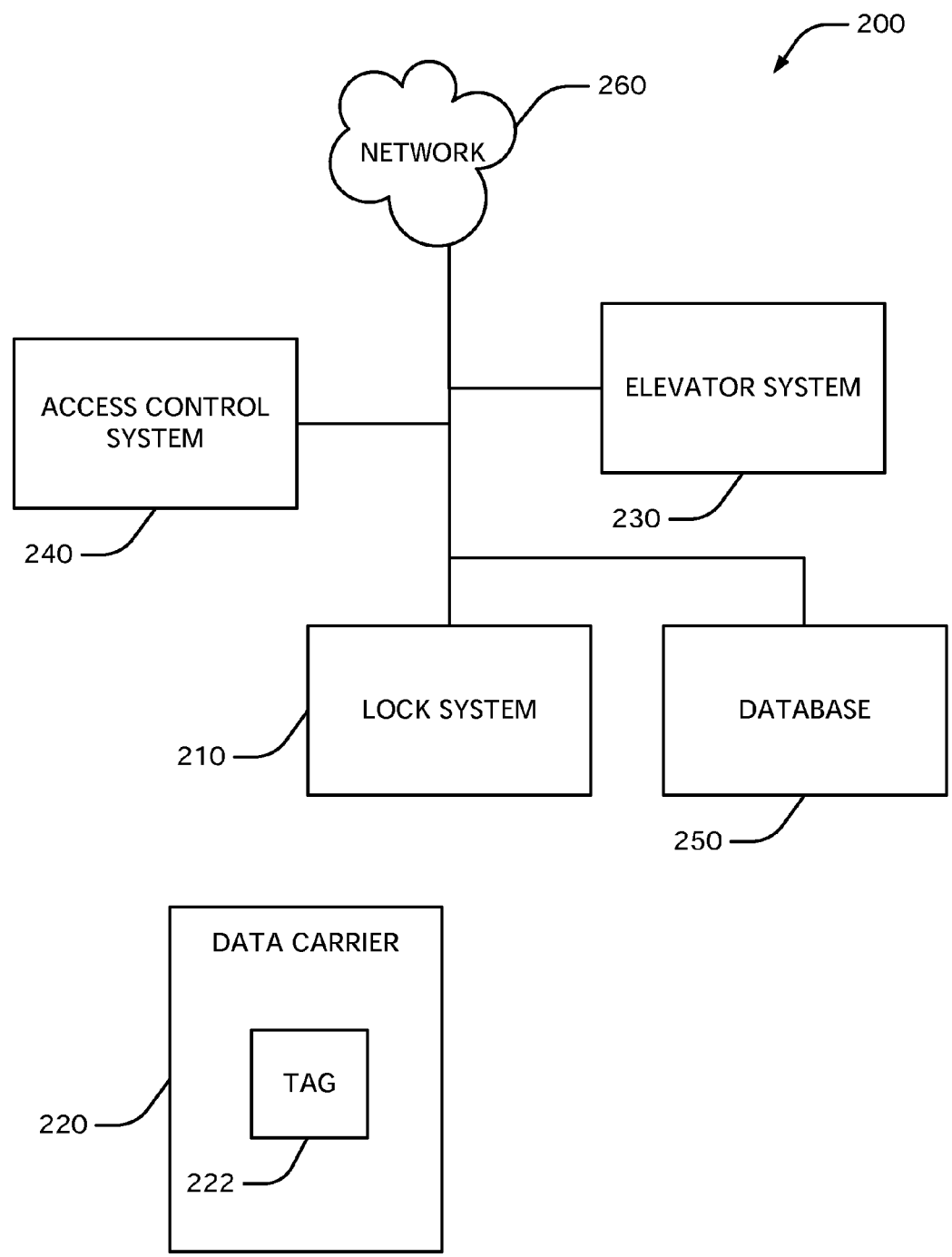
FIG. 2 shows a block diagram of an exemplary embodiment of a lock system environment.

FIG. 2 shows a block diagram of an exemplary embodiment of a lock system environment 200. The lock system environment 200 comprises a lock system 210, which can be an embodiment of the system 100 described in FIG. 1. In various embodiments, the lock system 210 can be coupled to an elevator system 230, to an access control system 240, and/or to another system. The lock system 210 can also be coupled to a database 250. The database 250 can store information about, for example, users, user permissions, access times for areas of a building and/or other types of information.

In some embodiments, the lock system 210 detects and reads information from one or more data carriers 220. The data carrier 220 comprises a tag 222, for example, an RFID tag or other radio-based device. The tag 222 can also comprise an optical code (e.g.: a one-dimensional code, such as a bar code; a two-dimensional code, such as a QR code; or another machine-readable image). The data carrier 220 can have the form of a card, the form of a key fob, or another form. In some embodiments, the data carrier 220 comprises a portable electronic device, such as an NFC-enabled device operating in card-emulation mode.

Components in the lock system environment 200 can be coupled to one or more other devices through a network 260.

FIG. 3A shows an exemplary embodiment of a lock system 300, which can be similar to the lock systems 100, 210 described above (although for clarity, not all features common to the lock systems 100, 210, 300 are shown in FIG. 3A). The lock system 300 comprises a housing 310 with three buttons 340, 342, 344 and a handle 330. In some embodiments, the lock 300 also includes a reader 320 for reading information from data carriers.

In any of the disclosed embodiments, the buttons (e.g., buttons 150, buttons 340, 342, 344) can be touch-sensitive buttons. In some embodiments, the buttons are other types of buttons (e.g., push buttons, membrane keys). The buttons can be integrated into a surface of the lock system such that they do not interrupt the surface. The buttons can also be individual components that are structurally distinct from the surface on which they are mounted.

In the embodiment of FIG. 3A, the buttons 340, 342, 344 can be arranged on a surface 312 of the housing 310 such that they are near and/or directly adjacent to each other. The buttons 340, 342, 344 can be integrated into the surface 312 such that they appear to be or are part of the surface 312.

In the embodiment of FIG. 3A, each of the buttons 340, 342, 344 is depicted as having a given surface area. For example, the button 340 includes the surface area 350, the button 342 includes the surface area 352, and the button 344 includes the surface area 354. In some embodiments, the buttons 340, 342, 344 produce the same respective input signals regardless of where on their respective surfaces they are touched. For example, the button 340 produces the same input signal regardless of whether a user touches the button 340 on the left side or the right side of the surface area 350. Thus, the lock system 300 cannot discern where on the surface area 350 that the user touches the button 340.

In particular embodiments, at least some of the buttons 340, 342, 344 are "hard-wired" into the lock 300. In other words, the button cannot be moved to a different portion of the surface 312 simply by reprogramming a component of the lock system 300, as perhaps could be done if the button were a user interface element on a touch-sensitive display.

In other embodiments, the buttons 340, 342, 344 comprise user interface elements shown on a touch-sensitive display on the surface 312.

The buttons 340, 342, 344 are depicted in FIG. 3A as being arranged in a single column. However, in various embodiments, the buttons can be arranged in multiple columns, in one or more rows, or in other configurations.

The buttons 340, 342, 344 can be used individually for inputting commands to the lock system 300 and/or to one or more systems. The commands that can be input vary according to the particular embodiment. Possible commands include, for example: lock a door; unlock a door; call an elevator to pick up a passenger; open a door for a visitor; send an elevator to pick up a visitor; and/or other commands.

FIG. 3B illustrates a further possible use of the buttons 340, 342, 344 on the lock system 300 or on a similar lock. A user slides a finger 360 along two or more of the buttons 340, 342, 344. In the depicted example, the user slides the finger 360 downward (as indicated by the arrow 362) across all three of the buttons 340, 342, 344. Thus, the finger 360 activates each of the buttons 340, 342, 344 in rapid succession while making a downward gesture. As explained further below, this and/or other gestures made on the lock surface 312 can be used to input commands to the lock 300 and/or to one or more systems. The term "gesture" generally refers to a motion that a user makes by sliding, for example, a finger (bare or covered with a glove) over two or more buttons one after another, thus activating each of the buttons.

Figure 4:
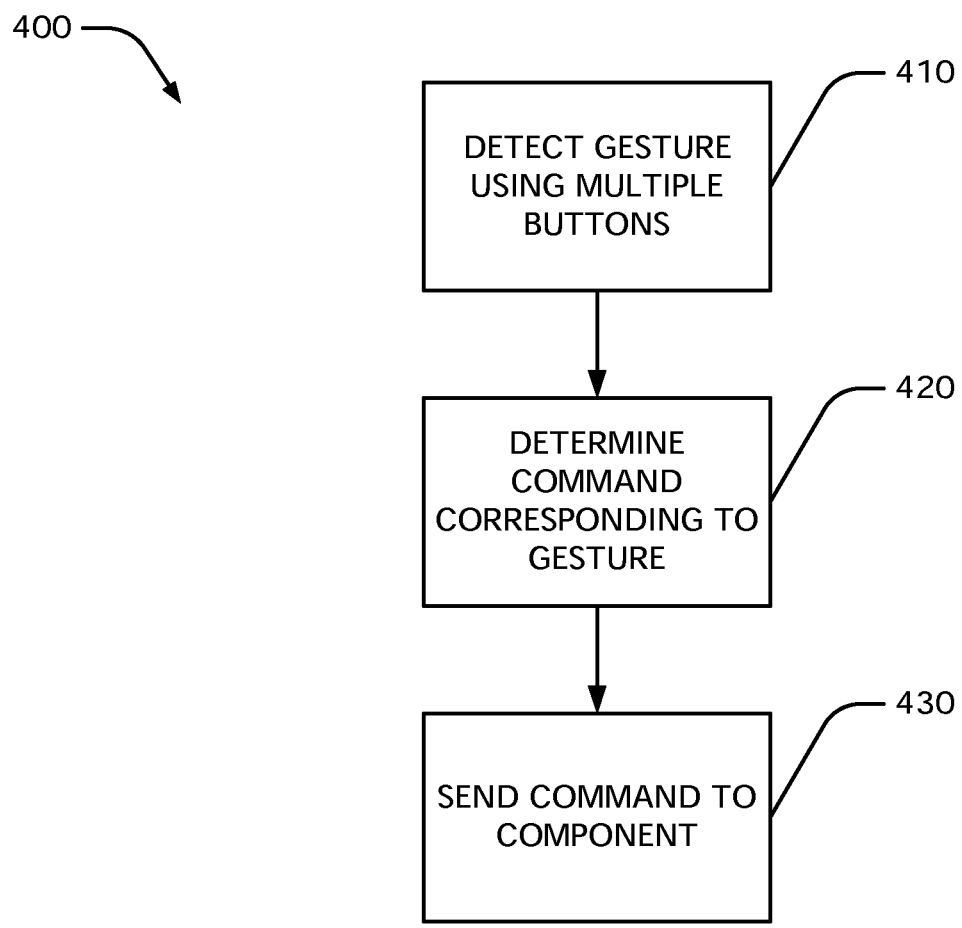
FIG. 4 shows a block diagram of an exemplary embodiment of a method for inputting lock commands.

FIG. 4 shows a block diagram of an exemplary embodiment of a method 400 for inputting lock commands. The method 400 can be used with an embodiment of the lock systems 100, 210, 300 or with another lock system. In a method act 410, the lock system detects a gesture being made on a surface using multiple lock buttons (e.g., two buttons, three buttons, four buttons, and/or another number of lock buttons). In a method act 420, the lock system determines a command corresponding to the detected gesture. In a method act 430, the determined command is sent to a component of the lock system and/or to another system to which the lock system is coupled.

Figure 5:
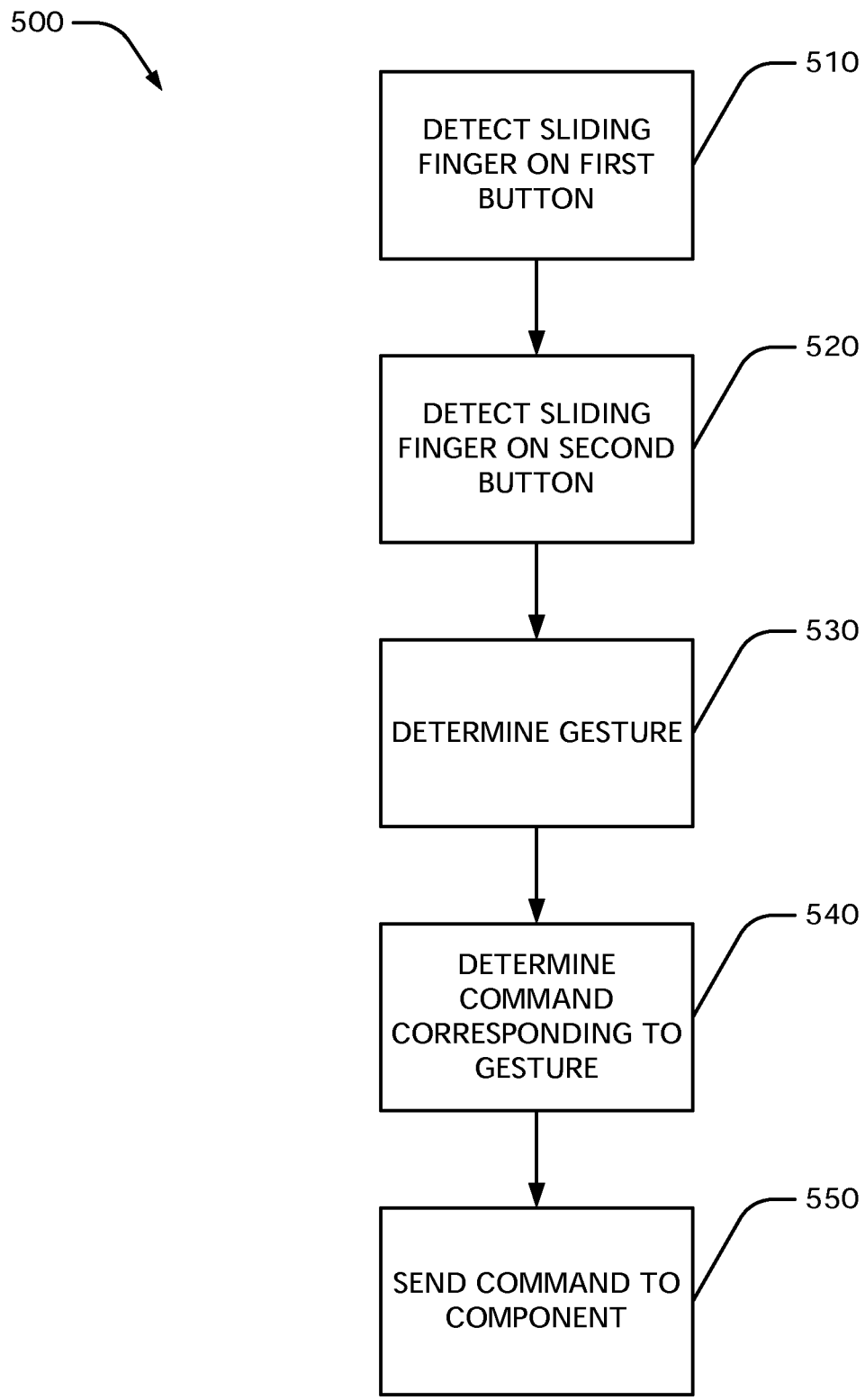
FIG. 5 shows a block diagram of an exemplary embodiment of a method for inputting lock commands.

FIG. 5 shows a block diagram of an exemplary embodiment of a method 500 for inputting lock commands. In a method act 510, a finger sliding on a first button of the lock is detected. In a method act 520, the finger is detected sliding on a second button of the lock adjacent to the first button. In a method act 530, a gesture is determined based on the buttons on which the sliding finger was detected. In at least some embodiments, the gesture is determined by the order of the buttons on which the sliding is detected. For example, in the context of FIG. 3A, if the finger is first detected sliding on the button 340 and then on the button 342, then a first gesture (e.g., a "DOWNWARD" gesture) is selected. However, if the finger is first detected sliding on the button 342 and then on the button 340, then a second gesture (e.g., an "UPWARD" gesture) is selected.

Returning to FIG. 5, in a method act 540 a command corresponding to the determined gesture is determined. For example, in some embodiments the "DOWNWARD" gesture is associated with an "UNLOCK" command, and the "UPWARD" gesture is associated with a "LOCK" command. In a method act 550, the determined command is sent to a component of the lock system and/or to another system to which the lock system is coupled.

In any of the disclosed embodiments, information associating particular buttons with particular gestures can be stored in a computer-readable medium in a list, a database or other format. In any of the disclosed embodiments, information associating particular gestures with particular commands can also be stored in a computer-readable medium in a list, a database or other format.

In any of the disclosed embodiments of the methods 400, 500, any of the method acts can be performed by, for example, computer-based device, such as a lock system control unit (e.g., the control unit 110).

Figure 6:
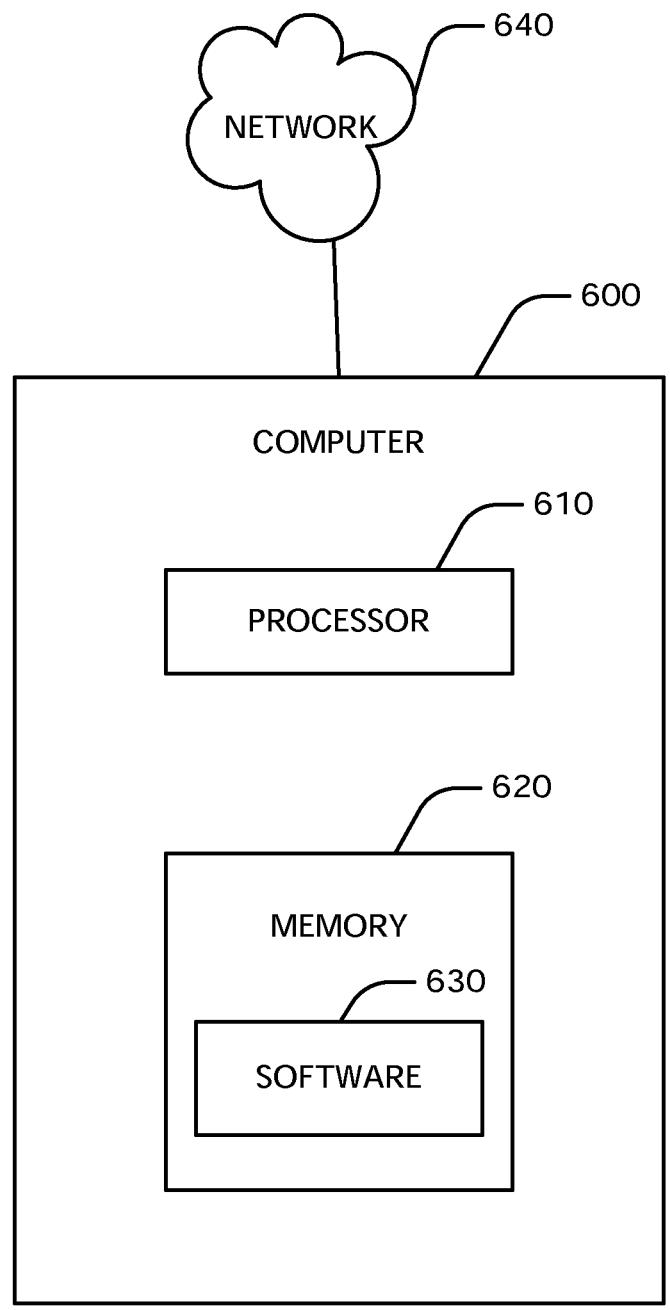
FIG. 6 shows a block diagram of an exemplary embodiment of a computer.

FIG. 6 shows a block diagram of an exemplary embodiment of a computer 600 (e.g., part of a lock system control unit, part of an elevator system, part of an access control system, part of a reader, part of a database) that can be used with one or more technologies disclosed herein. The computer 600 comprises one or more processors 610. The processor 610 is coupled to a memory 620, which comprises one or more computer-readable storage media storing software instructions 630. When executed by the processor 610, the software instructions 630 cause the processor 610 to perform one or more method acts disclosed herein. Further embodiments of the computer 600 can comprise one or more additional components. The computer 600 can be connected to one or more other computers or electronic devices through an input/output component (not shown). In at least some embodiments, the computer 600 can connect to other computers or electronic devices through a network 640. In particular embodiments, the computer 600 works with one or more other computers, which are located locally and/or remotely. One or more of the disclosed methods can thus be performed using a distributed computing system.

In any of the disclosed embodiments, an identification feature can be used. For example, the lock system can compare data read from a data carrier with a list of data for authorized users to determine if the user associated with the data carrier is authorized to input a given command.

In at least some cases, parts of the lock system appear on both sides of a door (e.g., inside and outside). The lock may be configured such that buttons for inputting gesture-based commands are arranged on parts of the lock system on both sides of the door, or only on parts of the lock system on one side of the door. For example, the buttons may be arranged only on the inside of the door.

In some cases, parts of the lock system appear on only one side of a door (e.g., inside or outside). For example, a data-carrier reader can be positioned on the outer side of the door. A control unit may be positioned on the inner side of the door.

In additional embodiments, one or more of the buttons of the lock system can be switched between two different modes. First, the buttons can be used in a mode where commands are input by simply touching (e.g., pressing) a button. Second, the buttons can be used in a mode where commands are input using a gesture formed by sliding a finger over two or more buttons (e.g., as described above in methods 400, 500). In particular embodiments, the buttons can be switched between these two modes manually by the user and/or automatically by the lock itself.

At least some of the disclosed embodiments can provide a user with additional ways to input commands into a lock system, namely using gestures made on a lock surface. In some cases, using gestures to input lock commands can, compared to other input methods, help avoid accidentally inputting a command. For example, in a configuration where a housing with a lock is positioned near the edge of a door, a user may grab the edge of the door to open or close it. When grabbing the edge of the door, the user may accidentally touch one or more buttons on the housing and thus unintentionally input a command into the lock. On the other hand, systems using one or more of the disclosed embodiments may avoid this problem by requiring more than just touching one button. That is, such systems are less susceptible to this problem because it is less likely that a user would accidentally form a gesture by sliding a finger across multiple buttons of the lock surface.

Additionally, some embodiments that use discrete, "hardwired" buttons for reading gestures can be simpler in construction and/or in operation compared to devices that use touchpads and/or touchscreen for reading gestures.

In one non-limiting example, a user approaches a door with a lock system, which has three buttons arranged in a column (e. g., as shown in FIGS. 3A and 3B). The user wishes to input a command to the lock system to call an elevator to the user's floor. Accordingly, the user slides a finger over the three buttons in a pre-defined gesture associated with this command. Particularly, the user places a finger on the top button and then slides the finger downward over the middle button and to the bottom button. Then, the user slides the finger from the bottom button upward, over the middle buttons and back to the top button. The lock system reads gesture information from an internally stored list and recognizes this gesture as being associated with a command to call the elevator to the user's floor. The lock system sends this command to the elevator system, which dispatches an elevator car accordingly.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act and/or one method act can be divided into two or more method acts.

As used herein, a "user" can be a person, a machine and/or an animal.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for inputting lock commands using gestures comprising the steps of:
   detecting a sliding finger on a first touch-sensitive button on a surface of an electronic lock system for a door;
   detecting the sliding finger on a second touch-sensitive button on the surface of the electronic lock system;
   determining a command associated with a gesture, the gesture being based on the detecting of the sliding finger on the first and second touch-sensitive buttons;
   sending the determined command to an external component coupled to the electronic lock system, the external component being in an elevator system; and
   calling or sending an elevator of the elevator system when the determined command is received by the external component.

2. The method according to claim 1 wherein when the detecting the sliding finger on the second touch sensitive button occurs before the detecting the sliding finger on the first touch-sensitive button, the determined command is a second command of two commands.

3. The method according to claim 1 including detecting the sliding finger on a third touch-sensitive button on the surface of the electronic lock system, the gesture being further based on the detecting the sliding finger on the third touch-sensitive button.

4. The method according to claim 1 including switching the electronic lock system between a single-button input mode and a gesture input mode.

5. The method according to claim 1 wherein the electronic lock system is mounted on or near the door.

6. The method according to claim 1 wherein when the detecting the sliding finger on the first touch sensitive button occurs before the detecting the sliding finger on the second touch-sensitive button, the determined command is a first command of two commands.

7. The method according to claim 6 wherein the two commands include a lock command and an unlock command.

8. An electronic lock system for a door comprising:
   a first touch-sensitive button;
   a second touch-sensitive button; and
   a control unit coupled to the first and second touch-sensitive buttons and to an elevator system, the control unit being programmed to,
      detect a sliding finger on the first touch-sensitive button,
      detect the sliding finger on the second touch-sensitive button,
      determine a command associated with a gesture, the gesture being based on the detecting of the sliding finger on the first and second touch-sensitive buttons,
      send the determined command to an external component coupled to the electronic lock system, the external component being in the elevator system, and
      call or send an elevator of the elevator system when the determined command is received by the external component.

9. The electronic lock system according to claim 8 including a third touch-sensitive button coupled to the control unit.

10. The electronic lock system according to claim 8 wherein the first touch-sensitive button is non-continuous with the second touch-sensitive button.

11. The electronic lock system according to claim 8 wherein the first touch-sensitive button has a first button surface area, the first touch-sensitive button providing a same input signal to the control unit across an entirety of the first button surface area.

12. The electronic lock system according to claim 8 wherein the first and second touch-sensitive buttons are hard-wired on a surface of the electronic lock system.

13. The electronic lock system according to claim 8 wherein the control unit is unable to determine on which portion of the first touch-sensitive button the sliding of the finger occurred.

14. The electronic lock system according to claim 8 wherein the determined command includes one of a lock command and an unlock command.

15. A non-transitory computer-readable storage medium having encoded thereon instructions that, when executed by a computer, cause the computer to perform a method comprising the steps of:
   detecting a sliding finger on a first touch-sensitive button on a surface of an electronic lock system for a door;
   detecting the sliding finger on a second touch-sensitive button on the surface of the electronic lock system;
   determining a command associated with a gesture, the gesture being based on the detecting of the sliding finger on the first and second touch-sensitive buttons;
   sending the determined command to an external component coupled to the electronic lock system, the external component being in an elevator system; and
   calling or sending an elevator of the elevator system when the determined command is received by the external component.

16. The non-transitory computer-readable storage medium according to claim 15 wherein the determined command includes one of a lock command and an unlock command.

* * * * *